(12) United States Patent
Hunt

(10) Patent No.: US 8,832,381 B2
(45) Date of Patent: Sep. 9, 2014

(54) CACHE AND A METHOD FOR REPLACING ENTRIES IN THE CACHE

(75) Inventor: Douglas B. Hunt, Ft. Collins, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 460 days.

(21) Appl. No.: 13/031,520

(22) Filed: Feb. 21, 2011

(65) Prior Publication Data

US 2012/0215985 A1     Aug. 23, 2012

(51) Int. Cl.
*G06F 13/00* (2006.01)
*G06F 13/28* (2006.01)

(52) U.S. Cl.
USPC ............... 711/133; 711/159; 711/135

(58) Field of Classification Search
None
See application file for complete search history.

(56) References Cited

U.S. PATENT DOCUMENTS

2003/0120870 A1* 6/2003 Goldschmidt et al. ........ 711/136

FOREIGN PATENT DOCUMENTS

EP    0088840    * 3/1982

OTHER PUBLICATIONS

John L. Hennessy et al., "Computer Architecture: A Quantitative Approach", Third Edition, 2003, pp. 392-406, Chapter 5, Section 2.
David A. Patterson et al., "Computer Organization and Design: The Hardware/Software Interface", Fourth Edition, 2012, pp. 457-475, Chapter 5, Section 2.
Betty Prince, "Semiconductor Memories, A Handbook of Design: Manufacture and Application", Second Edition, pp. 54-57, Sections 3.4.1-3.4.6, Jun. 1997.

* cited by examiner

*Primary Examiner* — Eric S Cardwell
(74) *Attorney, Agent, or Firm* — Mahamedi Paradice LLP

(57) ABSTRACT

A processor is provided. The processor including a cache, the cache having a plurality of entries, each of the plurality of entries having a tag array and a data array, and a remapper configured to create at least one identifier, each identifier being unique to a process of the processor, and to assign a respective identifier to the tag array for the entries related to a respective process, the remapper further configured to determine a replacement value for the entries related to each identifier.

19 Claims, 4 Drawing Sheets

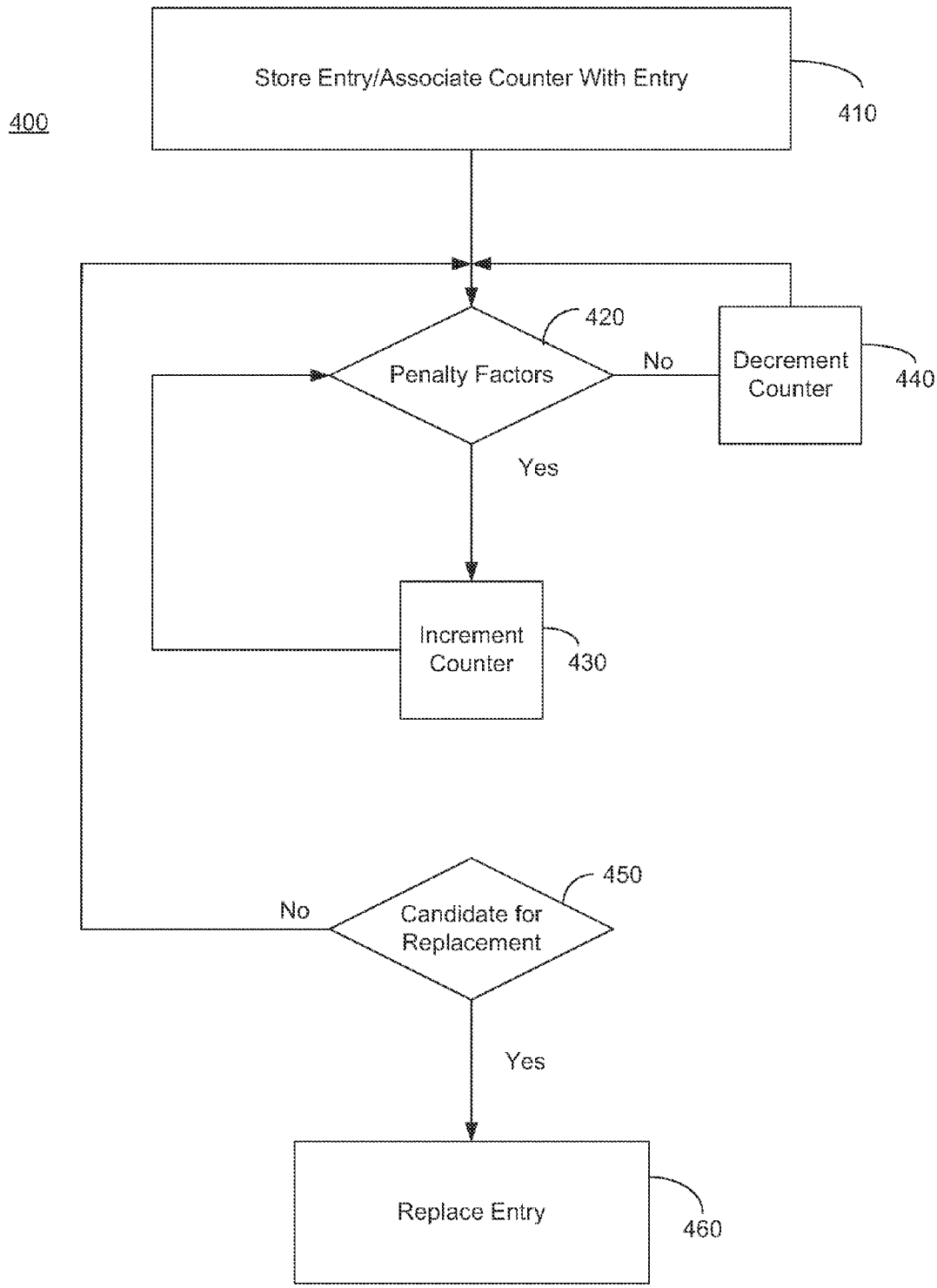

CACHE AND A METHOD FOR REPLACING ENTRIES IN THE CACHE

TECHNICAL FIELD

The technical field generally relates to a memory system, and more particularly to a memory system including a cache and a remapper used to determine a replacement value for entries in the cache.

BACKGROUND

In the context of computer architecture, a cache may be considered to be a memory system within a processor. While limited in space, a cache can retrieve data very quickly, often is as little as one processing cycle. Caches are used to store data which, for example, is accessed frequently or which is expected to be needed in the future. When a new entry has to be added to a cache, some existing entry must be discarded, so some method for choosing which entry to discard is needed. For example, many current cache designs replace the oldest entry therein when a new entry has to be added. If the entry which has been removed from the cache is later re-added, the processor suffers a penalty based upon the number of processing cycles the processor takes to rebuild the entry, which, had the entry not been removed, would not have been needed.

SUMMARY OF EMBODIMENTS OF THE INVENTION

A processor is provided. The processor including a cache, the cache having a plurality of entries, each of the plurality of entries having a tag array and a data array, and a remapper configured to create at least one identifier, each identifier being unique to a process of the processor, and to assign a respective identifier to the tag array for the entries related to a respective process, the remapper further configured to determine a replacement value for the entries related to each identifier.

A cache is further provided. The cache including a plurality of entries configured to store data, each entry having a tag, and a remapper configured to determine a unique identifier for each process and to store the identifier in the tag for respective entries associated with the process, and further comprising a plurality of counters, each of the plurality of counters associated with each unique identifier, wherein the remapper is configured to determine a replacement value for each identifier based upon a value of the counter associated with the identifier.

A method of determining which entry to remove from a remapper is provided. The method includes determining a three-bit identifier for each entry in the cache, associating a counter with each identifier, dynamically changing a value of each counter based upon a replacement value of the entry associated with the identifier, and determining which entry to replace based upon the value of each associated counter.

BRIEF DESCRIPTION OF THE DRAWINGS

The embodiments will hereinafter be described in conjunction with the following figures.

FIG. 4 illustrates yet another method for controlling a cache in a processor in accordance with an embodiment.

DETAILED DESCRIPTION

The following detailed description of the drawings is merely exemplary in nature and is not intended to limit the embodiments or the application and uses of the embodiments. Furthermore, there is no intention to be bound by any theory presented in the preceding background or the following detailed description.

Figure 1:
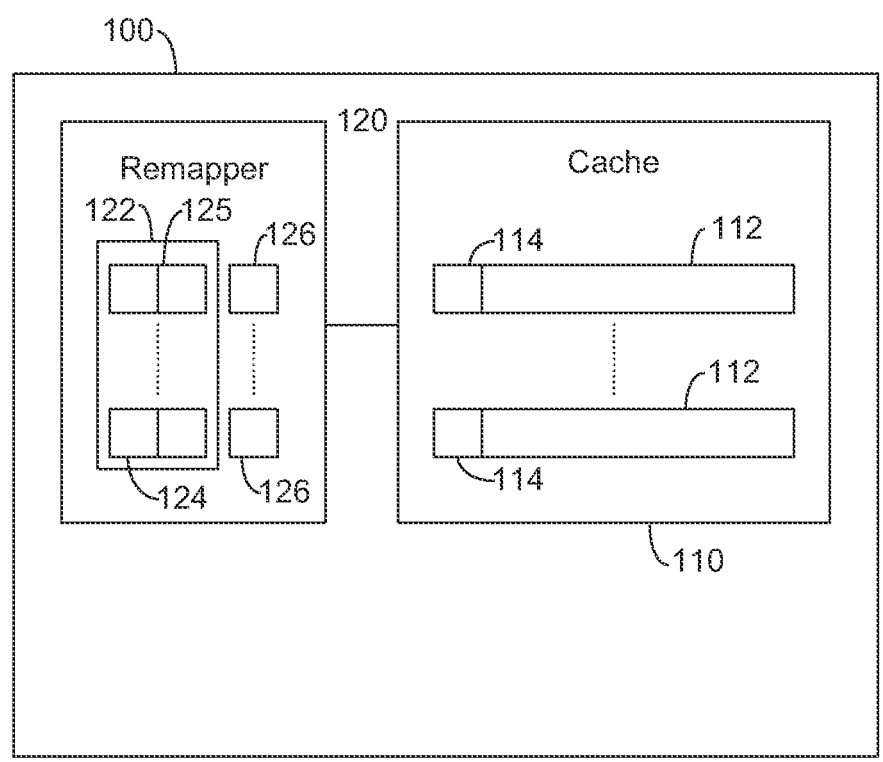
FIG. 1 illustrates an exemplary processor in accordance with an embodiment.

FIG. 1 illustrates an exemplary processor 100 in accordance with an embodiment. The processor 100 includes a cache 110 and a remapper 120. The processor may be, for example, a computer processing unit ("CPU") or a graphical processing unit ("GPU").

The cache 110 may be any type of cache. For example, the cache no may be a CPU or GPU cache such as a translation lookaside buffer ("TLB"), a page directory cache ("PDC"), a Guest TLB, a Guest PDC, or any other type of cache. The processor 100 may have multiple caches or a single cache capable of storing multiple types of data.

In other embodiments, the cache may be external to a processor. For example, the cache may be a network cache, a web cache or a disk cache.

When the cache 110 is embodied in a processor, the cache 110 has a fixed number of entries 112. The cache 110 may hold a subset of the information which is held in a larger memory structure. For example, in a microprocessor with a single level of cache, that cache is used to hold a subset of what is in a main memory. The cache 110 responds to a request to read some data much faster than the main memory can, but it is too small to hold all the data which the processor may need to access. For example, a cache 110 may only hold 2 MB of data, which there may be 2 GB of main memory in the system. Thus, in this example, the cache 110 can only hold 0.1% of the total data in the system at any given time. Since caches are a valuable resource for processors, effectively determining which existing entries in the cache are the best candidates to be replaced with new entries can improve the performance of the processor 100.

Each entry 112 in the cache 110 has a tag 114 associated therewith. The tag 114 stores an identification of the data stored in the entry 112. For example, the tag 114 may store an address space identifier ("ASID") identifying a specific process or operating system associated with the entry 112 in the cache 110. In a typical cache, the ASID stored in the tag 114 is usually sixteen bits wide. The remapper 120 is used to reduce the number bits needed to identify an entry 112 in the cache 110 and to determine a replacement value for each process or operating system which actively has entries 112 in the cache 110 as discussed in further detail below.

The remapper 120 includes a remapper table 122. The remapper table 122 stores an entry identifier 124 and an ASID 125. The entry identifier 124, which may also be called a hardware ASID, associates an identifier with each process or operating system associated with an existing cache entry. For example, if there are eight operating systems running on the processor 100, the remapper table 120 may have eight entries and eight entry identifiers 124. The eight entry identifiers 124 in this example may be simple numeric values zero through seven. The processor may also store the entry identifier 124 in the cache 110, for example, in a tag 114 of the cache 110.

The remapper table 120 may have any number of entries. In one embodiment, for example, the remapper table may have eight entries. In this example only three-bits are needed for the entry identifier. When larger remapper tables are be used (e.g., tables with sixteen, thirty-two or more entries), more bits would be required to store the entry identifiers 124 in the tags 114.

The processor may also store the entry identifier 124 associated with an entry in the cache 110, for example, in a tag 114 of a cache entry 112. By storing the entry identifier 124 in the cache entry 112 rather than the full software ASID 125, fewer bits may be needed in the cache entry 112 to identify the entry 112. For example, the software ASID 125 may be sixteen bits, where, in comparison, the entry identifier 124 may only have three to five bits. Accordingly, one benefit of the embodiment is that fewer bits are required to identify the entries in the cache 110.

The remapper also includes a counter 126 for each entry identifier 124/ASID 125 in the cache 110. The counter 126 may be used to determine how good of a choice the particular entries in the remapper 120 associated with the entry identifier 124/ASID 125 are as a replacement candidate. In one embodiment, the counter 126 may be used to determine a replacement value of an entry 124/125 in the remapper 120. Since the entry identifier 124 of a remapper entry may be associated with one or more entries in the cache 110, the replacement of an entry 124/125 in the remapper 120 requires the removal of one or more associated entries from the cache 110.

The replacement value may be calculated, for example, by determining how long the cache entries associated with a given remapper entry would take to reconstruct. In one embodiment, for example, the processor 100 may be running multiple OSs, such as Windows XP™, Windows 7™, Unix™, Apple OS™, etc. The processor 100 could also be running multiple instances of the same OS. Each OS or instance of the OS may have a series of TLB entries in the Guest TLB. In this example, each OS or instance of the OS would have its own entry identifier 124, ASID 125 and counter 126 in the remapper 120. If, for example, the remapper table 122 had eight entries, the remapper table could track up to eight different OS's or instances of the OS. If the processor attempts to start a ninth OS, for example, one of the existing entries in the remapper table 122, and all of the corresponding entries in the cache 110 would have to be removed. As discussed above, the remapper 120 may be used to determine which of the eight OS's and the associated entries in the cache 110 to be removed. In one embodiment, for example, the counter 126 associated with each OS may be incremented for each entry in the cache no associated with the OS. Accordingly, in one embodiment, the remapper may choose to remove the OS with the fewest number of cache entries, however, other methods of calculating a replacement value may be used, as discussed in further detail below. Other methods for calculating the replacement value are described in further detail below In one embodiment, for example, the cache entry 112 may be a PDC entry. As discussed above, the PDC would be associated with an entry 124 in the remapper table 122. A PDC entry stores page tables and a series of steps taken to calculate a physical address of data external to the processor 100. The counter 126 associated with the entry 124 in the remapper 120 can be incremented based upon, for example, a number of processing cycles it took to create the entry 112 or an amount of time spent creating the entry 112. Accordingly, the replacement value may be based upon a number of processing cycles the associated entry 112 took to create. The counter 126 may also be incremented each time a cache entry 112 is created which is associated with a given remapper entry 124/125 and it may be decremented every time an entry associated with a given remapper entry is removed from the cache. In another embodiment, the counter 126 can be incremented by a different amount where the amount is determined by the type of entry created—e.g., PDC entry, Guest TLB entry or any other type of entry stored in the cache. The amount the counter 126 is incremented by may be thought of as a "weight" associated with that type of entry where the weights are assigned based on the average number of processing cycles needed to re-create an entry of that type.

In another embodiment, for example, the counter 126 may increment every time a TLB entry is added to the cache 110 which was based upon the PDC entry. In this example, the PDC entry would have its own entry identifier 124 and ASID 125. Accordingly, PDC entries which are the basis for multiple TLB entries in the cache may have a higher priority to the remapper 120. In yet another embodiment, the counter 126 may keep track of how many processing cycles it took to create all of the entries associated with the remapper entry 124/125.

The cache may also store Guest PDC entries, which correspond to the page tables and steps used to create the Guest TLB entries. In this instance, each OS would have an entry identifier 124 and ASID 125. The counter 126 associated with each OS may increment for each associated entry (e.g., a Guest TLB or Guest PDC entry) placed in the cache 110. The counter 126 may also increment based upon how long the entries in the Guest TLB or Guest PDC took to generate, as discussed above. Accordingly, by incrementing the counter 126 associated with each running OS, the remapper 120 can determine which series of entries in the cache 110 for a corresponding OS took the longest to generate. Accordingly, if, for example, the entries 112 associated with a Windows™ operating system took a total of five hundred cycles to generate and the entries associated with a Unix™ operating system took a total of one hundred cycles to generate, the remapper may choose to remove the Unix™ entries even if the Unix™ entries are more recent than the Windows™ entries.

In another embodiment, the counters 126 associated with each OS may increment based upon how long the respective OS has been running. The remapper can then determine the value of entries associated with each OS based upon how often and how long each OS is used. For example, if a Windows™ OS is running 80% of the time and a Unix™ OS is running 20% of the time, the counter 126 associated with the Window™ OS would be higher. Accordingly, when determining a replacement candidate an entry associated with the Unix™ OS may be chosen to be replaced over a Windows™ entry even if the Unix™ OS has been running more recently and/or the Unix™ entry was added to the cache more recently.

In another embodiment, a counter 126 may be associated with a process, such as a specific thread, application, or any other entry type and may increment an associated counter 126 based upon cache entries associated with the respective process. In this instance, each process would have an entry in the remapper table 120.

One benefit, for example, of considering a replacement value for an entry 112 when considering whether or not to replace the entry 112, for example, is that a valuable entry 112 is less likely to be replaced, even if the entry 112 is old relative to the other entries in the cache 110.

The counter 126 may also decrement in certain instances. For example, the counter 126 may decrement when associated entries in the cache 110 are removed. For example, as discussed above, a counter 126 associated with a PDC may increment every time a TLB entry which is based upon the PDC is added to the cache 110. Likewise, the counter 126 may decrement each time a TLB entry associated with the PDC is removed.

In another embodiment, the counter 126 associated with an entry can decrease over time. For example, a counter 126 associated with an OS or a process may increment while the respective OS is running. Likewise, the counter associated with the OS or other process may decrease while the respective OS is not running.

The counter may increment or decrement by various amounts depending upon the entry associated with the counter. For example, in one embodiment a counter associated with an OS may increment once for each processing cycle the OS is running. However, the counter 126 may also increment once for every N processing cycle the OS is running, where N is greater than or equal to one. Likewise, the counter 126 may decrement once for each processing cycle the OS is not running or decrease once for every M processing cycles the OS is not running, where M is greater than or equal to one. In some embodiments the frequency for which a counter 126 is incremented and decremented may differ for the same entry.

The amount that the counter 126 increases or decreases may vary. For example, the counter 126 may increment or decrement X times for each N (or M) processing cycles, where X is greater than or equal to one.

In one embodiment, for example, the entry associated with the counter that has the lowest value may be chosen to be replaced by the remapper.

Figure 2:
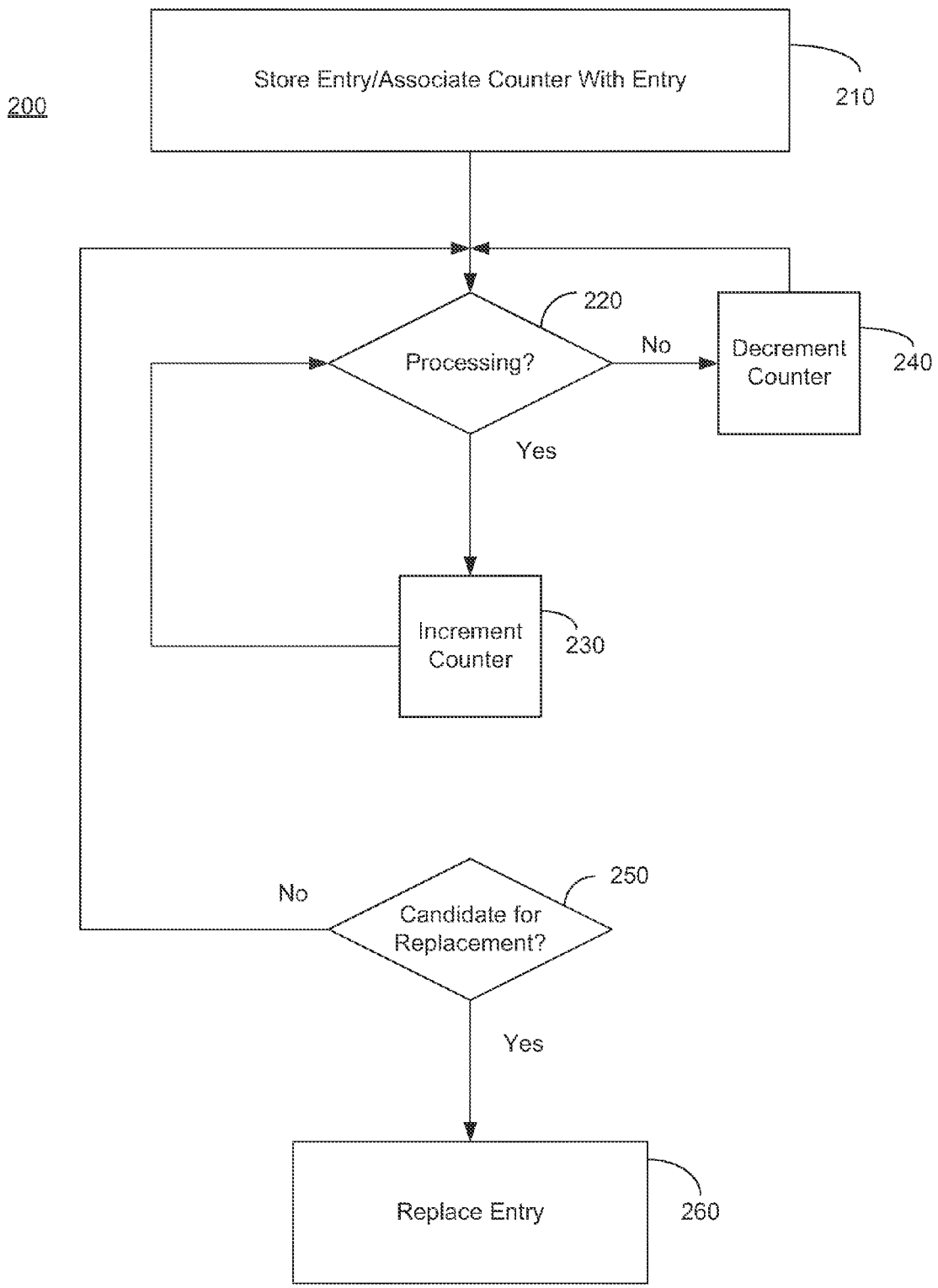
FIG. 2 illustrates a method for controlling a cache in a processor in accordance with an embodiment.

FIG. 2 illustrates a method 200 for controlling a cache 110 in accordance with an embodiment. When each entry 112 in the cache 110 is created, the remapper 120 creates an entry in the remapper table 122 and associates a counter 126 with the entry. (Step 210). If the remapper table 122 already has an entry (e.g., an entry identifier 124, an ASID 125 and counter 126) for an OS or process related to the cache entry, the processor would skip Step 210 and proceed to Step 220. The remapper then monitors the processor to determine if the processor is processing anything associated with each entry 112. (Step 220). As discussed above, the entry 112 may be associated, for example, with an OS, or a process, such as a thread or an application.

If the processor 100 is processing anything related to the entry 112, the counter 126 is incremented. (Step 230). As discussed above, the counter may increment once for every N processing cycles, where N is greater than or equal to 1. If the processor 100 is not processing anything related to the entry 112, the counter 126 is decremented. (Step 240) As discussed above, the counter may decrement once for every M processing cycles, where M is greater than or equal to 1. After the counter is incremented in Step 220 or decremented in Step 230, the remapper returns to Step 220 and continues to monitor the entry 112.

The processor 100, at any time, can monitor the counters 126 for each respective entry 112 in the cache 110 to determine which entry is a candidate for replacement. (Step 250). The processor may need to replace an entry 112 in the cache if, for example, the cache 112 is full and a new entry needs to be added, or if the remapper table is full and a new process or OS needs to be added. If the entry 112 is chosen to be replaced, the remapper 120 instructs the processor 100 to replace the entry 112. (Step 260). In one embodiment, for example, new entries 124/125 in the remapper may be given a slight bias (i.e., a non-zero starting value) so that new entries are less likely to be replaced.

Figure 3:
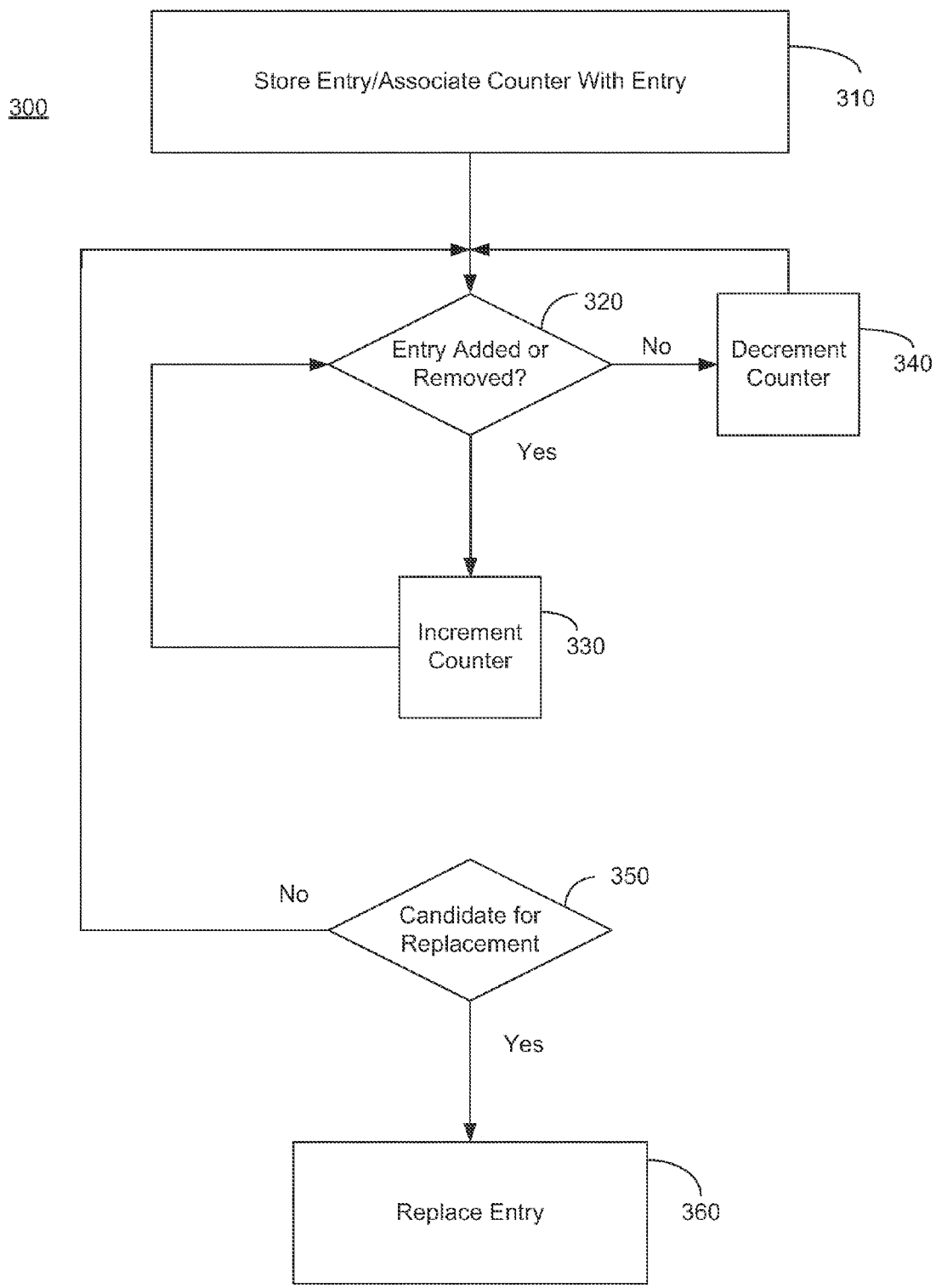
FIG. 3 illustrates another method for controlling a cache in a processor in accordance with an embodiment.

FIG. 3 illustrates a method 300 for controlling a cache in accordance with an embodiment. When each entry 112 in the cache 110 is created which does not have an entry (e.g., entry identifier 124, ASID 125 and counter 126) associated therewith in the remapper table 122, the remapper 120 creates an entry in the remapper table 122 and associates a counter 126 with the entry. (Step 310). The remapper 120 then monitors the cache 110 to determine if cache entries 112 associated with each entry in the remapper table 122 have been added or removed from the cache 110. (Step 320).

If an entry 112 related to the monitored entry identifier 124 is added, the counter 126 is incremented. (Step 330). The counter may increment by N for every entry added, where N is greater than or equal to one. In another embodiment, the counter may increment by N for every M number of related entries related to the monitored entry identifier 124 are added, where M is greater than or equal to two. For example, the counter 126 may be incremented by one for every two added entries which are related to the monitored entry identifier 124.

If an entry in the cache 110 related to the monitored entry identifier 124 is removed, the counter 126 is decremented. (Step 340). The counter may decrement by N, where N is greater than or equal to 1. In another embodiment, the counter may decrement by N for every M number of related entries related to the monitored entry identifier 124 are removed, where M is greater than or equal to two. For example, the counter 126 may be decremented by one for every two removed entries which are related to the monitored entry identifier 124.

After the counter is incremented in Step 330 or decremented in Step 340, the remapper returns to Step 320 and continues to monitor the entry identifier 124. As discussed above, the processor 100, at any time, can monitor the counters 126 for each respective entry 112 in the cache 110 to determine which entry 112 is a candidate for replacement. (Step 350). If the entry 112 is chosen to be replaced, the remapper 120 instructs the processor 100 to replace the entry 112. (Step 360)

FIG. 4 illustrates a method 400 for controlling a cache 110 in accordance with an embodiment. When each entry 112 in the cache 110 is created, the remapper 120 creates an entry identifier 124 and ASID in the remapper table 122, if necessary, and associates a counter 126 therewith. (Step 410). The remapper 120 then monitors the cache 110 to determine a replacement value for each entry in the remapper table 120. (Step 420). The replacement value may take into consideration various penalty factors associated with replacing the entries in the cache 110 associated with the entry in the remapper table 122. The penalty factors may include, but are not limited to, a number of processing cycles the entries 112 associated with the entry in the remapper table 122 took to generate, a size of the entries 112 associated with the entry in the remapper table 122, a number of times the entries 112 associated with the entry in the remapper table 122 has been accessed, or any combination thereof. The replacement value may also take into account a number of entries 112 associated with the entry in the remapper table 122 as discussed with reference to FIG. 3 and/or a number of processing cycles as discussed with reference to FIG. 2.

In one embodiment, the penalty factors used to determine the replacement value may vary for each entry 112 in the cache. For example, the penalty factor, or combination of penalty factors, used for an entry 112 may depend upon what type of data is being stored in the entry.

The counter 126 associated with the entry identifier 124 may be incremented or decremented to track the replacement value of the entry identifier 124. (Steps 430 and 440). As discussed above, the frequency and amount that the counter 126 is incremented or decremented can vary.

After the counter is incremented in Step 430 or decremented in Step 440, the remapper returns to Step 420 and continues to monitor the entry in the remapper table. As discussed above, the processor 100, at any time, can monitor the counters 126 for each respective entry 112 in the cache to determine which entry is a candidate for replacement. (Step 450). If the entry 112 is chosen to be replaced, the remapper 120 instructs the processor 100 to replace the entry 112. (Step 460).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiments in any way. Rather, the foregoing detailed description will provide those skilled in the art with a convenient road map for implementing an exemplary embodiment. It being understood that various changes may be made in the function and arrangement of elements described in an exemplary embodiment without departing from the scope of the invention as set forth in the appended claims.

What is claimed is:

1. A processor, comprising:
   a cache having a plurality of entries, each of the plurality of entries having a tag; and
   a remapper to map a particular address space identifier associated with multiple respective entries of the plurality of entries to a particular entry identifier having fewer bits than the particular address space identifier, to assign the particular entry identifier to the tag of each entry of the multiple respective entries, and to determine a replacement value for the multiple respective entries, the remapper comprising:
   a counter associated with the particular entry identifier,
   wherein the remapper determines the replacement value for the multiple respective entries based upon a value of the counter, the multiple respective entries being related to a process associated with the particular address space identifier.

2. The processor of claim 1, wherein the counter associated with the particular entry identifier increments for each processing cycle which is related to the particular entry identifier.

3. The processor of claim 2, wherein the counter associated with the particular entry identifier decrements for each processing cycle which is unrelated to the particular entry identifier.

4. The processor of claim 1, wherein the counter associated with the particular entry identifier increments when another entry is added to the cache which is related to the particular entry identifier.

5. The processor of claim 4, wherein the counter associated with the particular entry identifier decrements when an entry is removed from the cache which was related to the particular entry identifier.

6. The processor of claim 1, wherein the value of the counter changes based upon a size of the multiple respective entries.

7. A cache, comprising:
   a plurality of entries to store data, each entry having a tag; and
   a remapper to map an address space identifier for each process of a plurality of processes to a respective entry identifier associated with the process and having fewer bits than the address space identifier for the process, and to store the respective entry identifier in the tag for multiple respective entries associated with the process, the remapper comprising a plurality of counters, each of the plurality of counters associated with a respective entry identifier,
   wherein the remapper is configured to determine a replacement value for each entry identifier based upon a value of the counter associated with the respective entry identifier.

8. The cache of claim 7, wherein a value of the counter associated with a respective entry identifier increases while the process associated with the respective entry identifier is running.

9. The cache of claim 8, wherein the value of the counter associated with a respective entry identifier decreases while the process associated with the respective entry identifier is not running.

10. The cache of claim 7, wherein a value of the counter associated with a respective entry identifier increases when an entry is added to the cache which is related to the respective entry identifier.

11. The cache of claim 10, wherein the value of the counter associated with the respective entry identifier decreases when an entry is removed from the cache which was related to the respective entry identifier.

12. The cache of claim 7, wherein a value of the counter for each entry identifier changes based upon a respective size of the entries associated with the entry identifier.

13. A method of managing a cache, comprising:
   mapping respective address space identifiers of a plurality of address space identifiers to respective entry identifiers for entries in a cache, the entry identifiers having fewer bits than the address space identifiers, wherein at least one respective address space identifier as mapped to a respective entry identifier corresponds to multiple entries in the cache;
   storing the respective entry identifiers in tags for the entries;
   associating a counter with each entry identifier;
   dynamically changing a value of each counter to calculate a replacement value of entries having the entry identifier associated with the counter; and
   determining which entry to replace based upon the value of each counter.

14. The method of claim 13, further comprising:
   associating each entry identifier with a unique process of a plurality of processes, wherein the respective address space identifiers are associated with respective processes of the plurality of processes; and
   increasing a value of the counter associated with a respective entry identifier when the process associated with the entry identifier is running.

15. The method of claim 14, further comprising decreasing a value of the counter associated with the respective entry identifier when the process associated with the entry identifier is not running.

16. The method of claim 13, further comprising increasing a value of the counter associated with a respective entry identifier when an entry is added to the cache which is related to the respective entry identifier.

17. The method of claim 16, further comprising decreasing a value of the counter associated with a respective entry identifier when an entry is removed from the cache which was related to the respective entry identifier.

18. The method of claim 13, wherein a value of the counter for each respective entry identifier changes based upon a size of each respective entry in the cache associated with the entry identifier.

19. The method of claim 13, wherein the determining comprises determining which entry identifier has the counter having a lowest value.

* * * * *